United States Patent
Machacek

(10) Patent No.: US 11,640,466 B2
(45) Date of Patent: May 2, 2023

(54) FIRMWARE FOR SMALL MCU CARRYING A LARGE SET OF FEATURES

(71) Applicant: Honeywell International Inc., Morris Plains, NJ (US)

(72) Inventor: Jiri Machacek, Zastávka (CZ)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 136 days.

(21) Appl. No.: 16/853,187

(22) Filed: Apr. 20, 2020

(65) Prior Publication Data
US 2021/0326444 A1 Oct. 21, 2021

(51) Int. Cl.
G06F 9/44 (2018.01)
G06F 21/57 (2013.01)
G06F 16/9035 (2019.01)
G06F 9/4401 (2018.01)

(52) U.S. Cl.
CPC .......... *G06F 21/572* (2013.01); *G06F 9/4411* (2013.01); *G06F 16/9035* (2019.01)

(58) Field of Classification Search
CPC .............. G06F 21/572; G06F 16/9035; G06F 9/4411
See application file for complete search history.

(56) References Cited

U.S. PATENT DOCUMENTS

| | | | |
|---|---|---|---|
| 6,631,520 B1 | 10/2003 | Theron et al. | |
| 7,856,614 B2 | 12/2010 | Lu et al. | |
| 10,152,238 B2 | 12/2018 | Kim | |
| 2005/0289248 A1 | 12/2005 | Payne | |
| 2007/0143589 A1* | 6/2007 | Rawe | G06F 9/441 713/2 |
| 2012/0023322 A1* | 1/2012 | Landry | G06F 8/65 713/2 |
| 2012/0166781 A1* | 6/2012 | de Cesare | H04N 7/162 713/1 |
| 2014/0075169 A1* | 3/2014 | Andrews | G06F 8/60 713/2 |
| 2014/0129820 A1* | 5/2014 | Lim | G06F 8/654 713/2 |
| 2016/0232356 A1* | 8/2016 | Barkelew | H04L 9/3268 |
| 2019/0122472 A1* | 4/2019 | Johnson | G07C 9/00857 |
| 2019/0243659 A1* | 8/2019 | Lewis | G06F 21/572 |

OTHER PUBLICATIONS

"KBA_BT_0604: Switching Between Firmware Images Using Internal Storage Bootloader," Silicon Labs, 13 pages, Jul. 19, 2017.
Extended European Search Report, EP Application No. 21168463.4, dated Sep. 28, 2021 (11 pages).

* cited by examiner

*Primary Examiner* — Zahid Choudhury
(74) *Attorney, Agent, or Firm* — Seager, Tufte & Wickhem, LLP

(57) ABSTRACT

A controller and techniques for expanding its feature capabilities. Techniques may incorporate using an external memory to store feature sets that can be downloaded to an internal memory for intimate incorporation and usage by the controller. The external memory may be large in comparison to the internal memory. External storage of additional feature sets allows for use of a small and simple controller with access to numerous feature sets that otherwise could not be incorporated by the small controller.

20 Claims, 4 Drawing Sheets

FIRMWARE FOR SMALL MCU CARRYING A LARGE SET OF FEATURES

BACKGROUND

The present disclosure pertains to microcontrollers and feature capabilities.

SUMMARY

The disclosure reveals a controller and techniques for expanding its feature capabilities. Techniques may incorporate using an external memory to store feature sets that can be downloaded to an internal memory for intimate incorporation and usage by the controller. The external memory may be large in comparison to the internal memory. External storage of additional feature sets allows for use of a small and simple controller with access to numerous feature sets that otherwise could not be incorporated by the small controller.

DESCRIPTION

Figure 1:
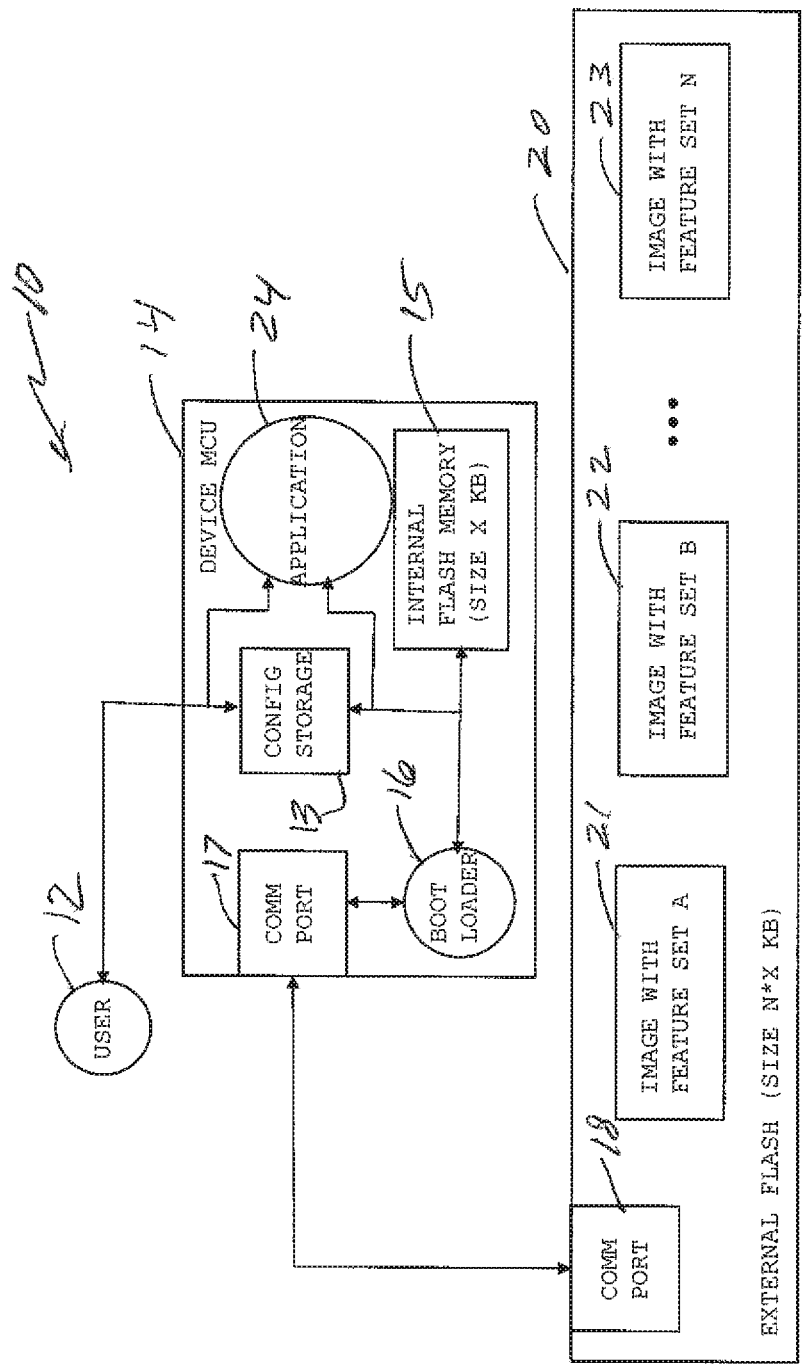
FIG. 1 is a diagram of a layout of the present system.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

With a growing need for "connectivity" of each product, devices are becoming more expensive and more complex to fulfill customers' requirements. Typically, when a new product vision is developed, features, communication interfaces and protocols may be selected to provide as best as possible usability of the product in an end application. But one size does not necessarily fit all. Taking a burner controller with an Ethernet interface as a model example, this device may communicate via following protocols such as Ethernet/internet protocol (IP), Profinet, EtherCat, and so forth.

The burner controller may typically be a high-volume, low-cost device, so it does not necessarily use a high power central processing unit (CPU), and its low cost microcontroller unit (MCU) may usually have a constrained internal memory and processing speed.

State of the art may be noted. Now when it comes to a particular trade or skill, typically, the user may need a limited set of features. But to get as big market share as possible, the manufacturer should provide a device with all of the needed features. This may result into two solutions. A larger and more expensive MCU may implement all of the features, but need to develop more complicated firmware, and be tested while distributing devices with only a limited feature set, and the like, may bring in an issue with more device models to maintain, release process, manufacture, and so on. Again, speaking in a language of examples, one may have a device with a capability of all possible communication protocols. For example, the MCU of such a device may need to be big in an amount of FLASH, RAM, and processing power. Or for another example, one may sell two types of the same device, one running with, e.g., Profinet, and another one, EtherCat.

In a first situation, a device may be completely flexible but require more internal resources in an MCU to keep the device functionality available and running. Firmware inside the MCU may be more complex and have obviously a higher risk profile and since when there are more communication stacks, that may increase the risk of issues.

In a second situation, a device may be relatively simple, and its MCU may be cheaper, smaller and less versatile. But when a customer decides to switch to a different functionality, the customer may need to buy new hardware.

An alternative may be noted. At the present time, newly developed devices may be equipped with boot loaders. A boot loader may be a very simple piece of software that loads firmware from external media (e.g., a cheap external flash) to an MCU internal memory (i.e., a firmware upgrade) and verifies the signature upon a boot (i.e., a secure boot). But there may be another use case that is not necessarily utilized; however, it can bring interesting opportunities. If a device was equipped with an on-board flash memory (which it usually already is), this flash memory may be partitioned to contain various types of firmware such as firmware with a feature set A (e.g., Profinet firmware), firmware with a feature set B (EtherCat), and so on. In this way, a single piece of hardware may be used to switch between completely different functionalities. A boot loader may select which firmware (i.e., feature set) customer wants, load it and boot it. The device may be sold to customers for a price of all features together, but utilize a smaller MCU and make resulting hardware and all features possible, plus have a cheaper design.

Technical benefits of the present approach may include lower prices of hardware and software, and an MCU with less computational power and storage resources that can be used; features that are often used in mutually exclusive ways that do not have to directly coexist, which makes development easier. Expanding this approach further, boot loader intelligence may be expanded so it can get an ability to enable a feature set (i.e., certain firmware) only when activated explicitly by remote command. It is expected that to fulfill customer requirements, there may be a large set of communication protocols required to be supported.

Newly developed devices that expect to be supporting wide range of features (e.g., communication protocols) may have several compiled firmware files stored in an external non-volatile memory (flash) which is generally more inexpensive than related art approaches. During an MCU selection process, it is possible to target lower-specification devices with a lower amount of internal flash and ram. The final products may be considered to be providing a superset of all features across all firmware files carried in an external memory.

FIG. 1 is a diagram of a layout of the present system 10. A user or users' interface 12 may have a connection with a processor 24 of a device MCU 14. Application 24 uses a configuration storage 13, an internal flash memory 15 and coexists with boot loader 16. Boot loader 16 may be connected to an external flash unit 20 via communication ports 17 and 18. A selection may be made from images with feature sets 21-23. There may be a total of N feature sets from which to choose. N shall be greater than 1. External flash memory 20 may have a greater storage or memory capacity (i.e., hold more feature sets) than internal flash memory 15.

Figure 2:
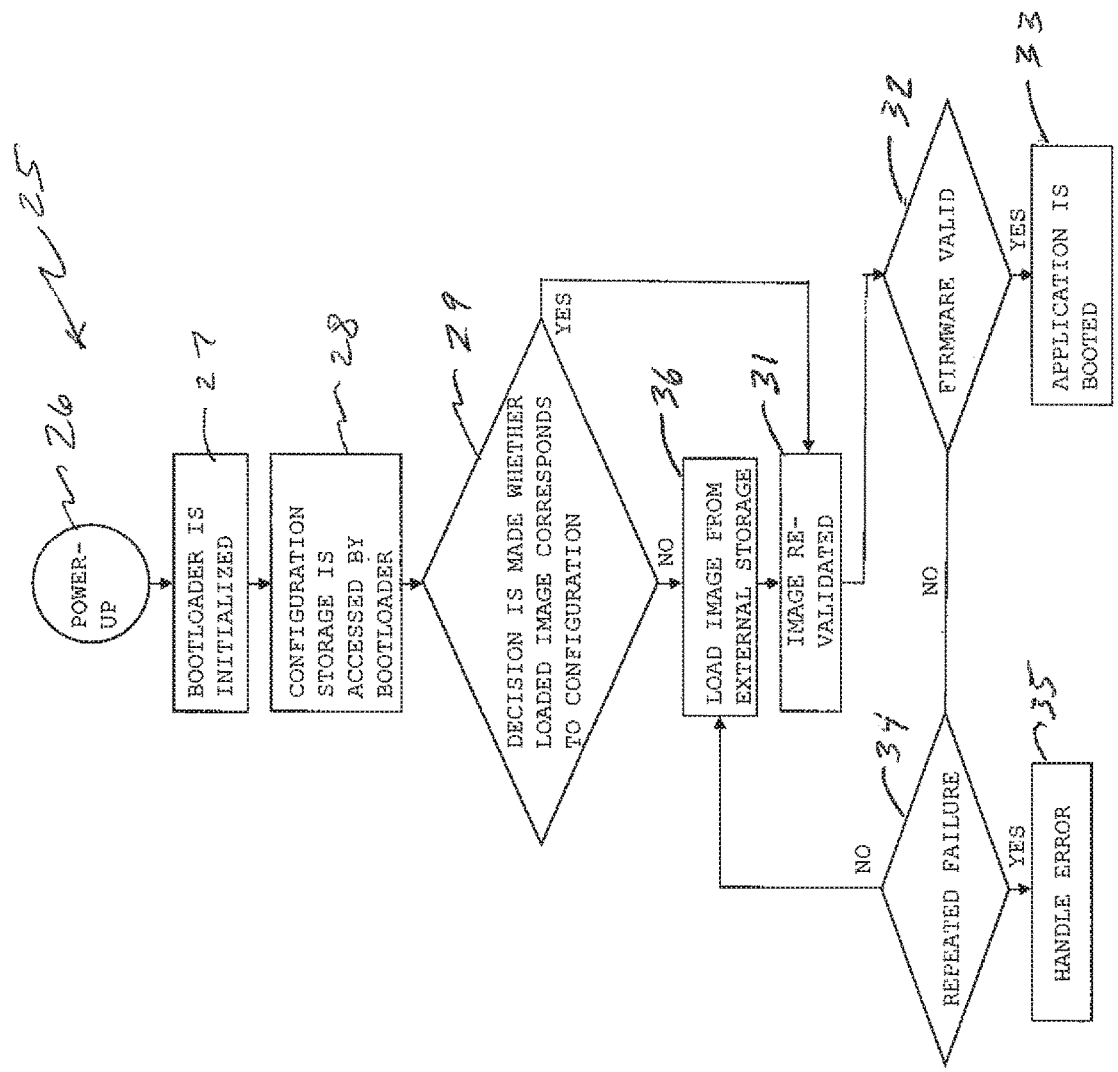
FIG. 2 is a diagram of a power-up procedure for the system.

FIG. 2 is a diagram of a power-up procedure 25. After power up 26 boot loader 27 is initialized. Configuration storage 28 is accessed by boot loader 27. At symbol 29, a decision is made whether a loaded image corresponds to a configuration. If an answer is yes, then the image may be validated at symbol 31. After validation of the image, a question of whether the firmware is valid is noted at symbol 32. If the firmware is valid, then the application is booted as per step 33. If the firmware is not valid at symbol or step 32, then a question may be asked whether the failure is repeated at symbol 34. If the failure is repeated, then the error may be handled at step or symbol 35. If an answer is no, then an image may be loaded from an external storage at symbol or step 36. The image may be re-validated at step 31. Then symbols or steps 32 and 33 or 34 may be repeated.

The procedure of the question asked at symbol 29 may instead be no rather than yes as indicated above. Then at symbol or step 36, an image may be loaded from the external storage and be validated at step or symbol 31. Then steps or symbols 32 and 33 or 34 may be repeated as indicated above.

Figure 3:
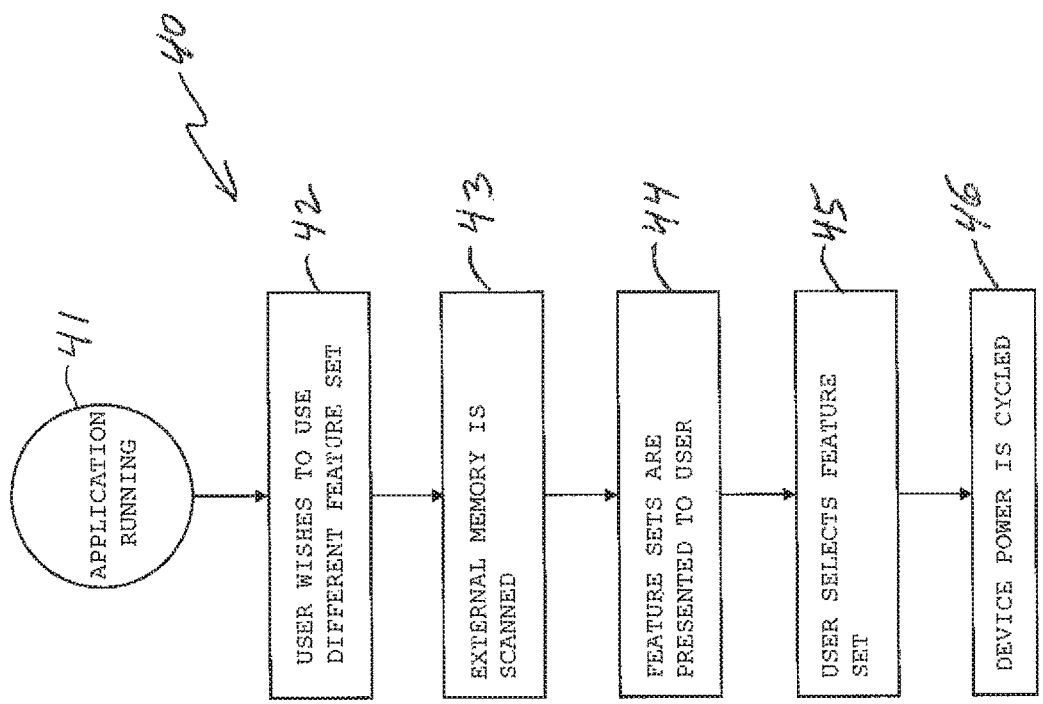
FIG. 3 is a diagram of a configuration change within the system.

FIG. 3 is a diagram of a configuration change 40 within system 10. An application may be running at symbol 41. A user may want to use a different feature set according to symbol 42. An external memory may be scanned at step 43 for feature sets which may be presented to the user at step 44. The user may select a feature set at step 45. Then, the device power may be cycled at step 46.

Figure 4:
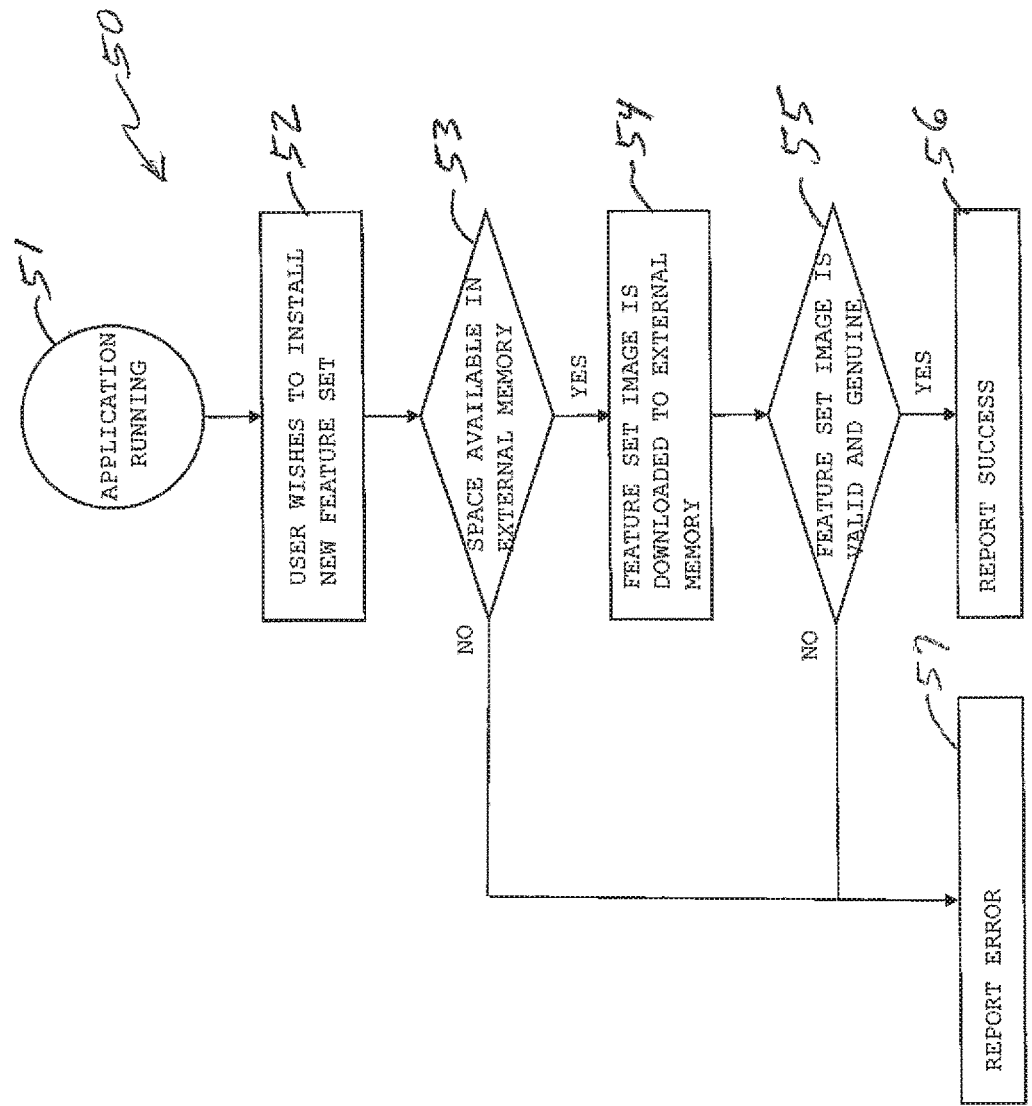
FIG. 4 is a diagram of a feature set change within the system.

FIG. 4 is a diagram of a feature set change 50. An application may be running at symbol or step 51. A user may want to install a new feature set at step or symbol 52. At symbol 53, a question may be asked whether space is available in an external memory. If the answer is yes, then the desired feature set image may be downloaded to the external memory at symbol or step 54. At symbol or step 55, a question of whether the feature set image is valid and genuine may be asked. If an answer is yes, then success may be reported at symbol 56. If the answer is no, then an error is reported at step or symbol 57. Similarly, if the answer to the question whether there is no space available at the external memory at symbol 53, is no, then an error is reported at step or symbol 57.

To recap, a burner controller unit system may incorporate a user interface, a microcontroller connected to the user interface, and an external memory connectable to the microcontroller. The microcontroller may incorporate an application handling the user interface, a configuration storage handled by the application and a boot loader, and an internal memory accessible by the application and the boot loader. The boot loader may be accessible by the application. The external memory may incorporate more storage capacity than a storage capacity of the internal memory.

The internal memory can hold at least one feature set. The external memory can hold more feature sets than the internal memory.

The external memory may incorporate a plurality of feature sets. Each feature set may be stored in a form of an image in the external memory.

The internal memory may be partitioned to contain various types of firmware. The various types of firmware may incorporate a feature set A and a feature set B.

The feature set A may incorporate a functionality that may or may not be incorporated to the feature set B.

The boot loader may be initialized. The configuration storage may be accessed. The boot loader may load an image from the external memory to the internal memory. A question is whether a loaded image may correspond to a configuration in the configuration storage. If an answer to the question is yes, then the image may be validated. A second question is whether firmware of the image may be valid. If the firmware is valid, then a boot may be applied. If the firmware is invalid, then an error may be reported.

The boot loader may be initialized. The configuration storage may be accessed. The boot loader may load an image from the external memory to the internal memory. A question may be asked whether a loaded image corresponds to a configuration in the configuration storage. If an answer to the question is no, then another image may be loaded from the external storage. The other image may be validated. A question may be asked whether the firmware of the other image is valid. If the firmware is valid, then a boot may be applied. If the firmware is invalid, then an error may be is reported.

A configuration change may be implemented. The external memory may be scanned. Feature sets may be presented for selection. A feature set may be selected. The device may be reinitialized A new feature set may be installed. An inquiry may be made of whether space is available in the external memory. If space is unavailable in the external memory, then an error may be reported.

A new feature set may be installed. An inquiry may be made of whether space is available in the external memory. If space is available, then a feature set may be downloaded to the external memory. An inquiry may be made to determine whether the feature set is valid and genuine. If an answer is yes, then a success may be reported. If the answer is no, then an error may be reported.

An approach for enabling a small microcontroller unit to operate with a large number of feature sets, may incorporate obtaining a microcontroller having an application with access to an internal memory and a boot loader with the same access, and finding an external memory connectable to the processor. The external memory may incorporate more storage capacity than a storage capacity of the internal memory.

The storage capacity of the internal memory and the external memory may be proportional to a number of feature sets stored in the internal memory and the external memory.

The approach may further incorporate doing a feature set addition or change for the microcontroller, incorporating determining which new feature set is to be selected for a microcontroller, checking for space available in the external memory for a new feature set, downloading a new feature set image to the external memory if storage capacity is available in the external memory, and determining whether the feature set image is valid and genuine.

A feature set may represent a functionality that is distinct from a functionality of another feature set.

The microcontroller may contain and use just one feature set. The microcontroller may have an internal memory that needs only to hold one feature set to be loaded and booted.

If the microcontroller needs a different functionality than that of the feature set presently set in it, then the microcontroller may replace the present feature set with another feature set having the different functionality, loaded from the external memory.

A controller unit may incorporate a microcontroller, and an external memory connectable to the microcontroller. The microcontroller may incorporate an application, a boot loader, a configuration storage accessible by the application and the boot loader, and an internal memory accessible by the application and the boot loader. The external memory may have more storage capacity than a storage capacity of the internal memory.

The internal memory may hold at least one feature set, and the external memory may hold more feature sets than the internal memory.

Changing a feature set in the internal memory for a different feature set, may incorporate scanning an external memory for available feature sets, presenting the available feature sets for selection to a user, and checking a user selected feature set for validity and genuineness.

If valid and genuine, the selected feature set may be downloaded from the external memory to the internal memory.

Any publication or patent document noted herein may hereby be incorporated by reference to the same extent as if each individual publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A burner controller comprising:
a user interface;
a microcontroller connected to the user interface; and
an on-board memory connectable to the microcontroller and external to the microcontroller, the on-board external memory storing a plurality of firmwares and each firmware is for a different communication protocol; and
wherein:
the microcontroller comprises:
an application handling the user interface;
a configuration storage handled by the application and a boot loader; and
an internal memory accessible by the application and the boot loader; and
wherein:
the boot loader is accessible by application;
the on-board memory comprises more storage capacity than a storage capacity of the internal memory;
the internal memory is configured to hold at least one feature set;
the on-board memory is configured to hold more feature sets than the internal memory; and
each feature set is a different communication protocol firmware.

2. The system of claim 1, wherein the internal memory is flash memory.

3. The system of claim 2, wherein each feature set held on the on-board memory is stored in a form of an image in the on-board memory.

4. The system of claim 2, wherein:
the internal memory is partitioned to contain various types of firmware; and
the various types of firmware comprise a feature set A and a feature set B.

5. The system of claim 4, wherein the feature set A incorporates a functionality that is or is not incorporated to the feature set B.

6. The system of claim 1, wherein:
the boot loader is initialized;
the configuration storage is accessed;
the boot loader loads an image from the on-board memory to the internal memory;
a question is whether a loaded image corresponds to a configuration in the configuration storage;
if an answer to the question is yes, then the image is validated;
a second question is whether firmware of the image is valid;
if the firmware is valid, then a boot is applied; and
if the firmware is invalid, then an error is reported.

7. The system of claim 1, wherein:
the boot loader is initialized;
the configuration storage is accessed;
the boot loader loads an image from the on-board memory to the internal memory;
a question is asked whether a loaded image corresponds to a configuration in the configuration storage;
if an answer to the question is no, then another image is loaded from the on-board memory;
the another image is validated;
a question is asked whether the firmware of the another image is valid;
if the firmware is valid, then a boot is applied; and
if the firmware is invalid, then an error is reported.

8. The system of claim 1, wherein: a configuration change is to be implemented; the on-board memory is scanned; feature sets are presented for selection; a feature set is selected; and device is reinitialized.

9. The system of claim 1, wherein:
a new feature set is to be installed;
an inquiry is made of whether space is available in the on-board memory; and
if space is unavailable in the on-board memory, then an error is reported.

10. The system of claim 1, wherein:
a new feature set is to be installed;
an inquiry is made of whether space is available in the on-board memory;
if space is available, then a feature set is downloaded to the on-board memory;
an inquiry is made to determine whether the feature set is valid and genuine;
if an answer is yes, then a success is reported; and
if the answer is no, then an error is reported.

11. A method for enabling a small microcontroller unit of a device to operate with a large number of communication protocols, comprising:
obtaining a device having a microcontroller having an application with access to an internal memory and a boot loader with the same access; and
finding an external memory connectable to the microcontroller, the external memory is on-board the device and includes firmware for a plurality of communication protocols; and
wherein the external memory comprises more storage capacity than a storage capacity of the internal memory.

12. The method of claim 11, wherein the storage capacity of the internal memory and the external memory is proportional to a number of feature sets stored in the internal memory and the external memory, and the feature sets correspond to the firmware for the plurality of communication protocols.

13. The method of claim 12, wherein doing a feature set change for the microcontroller, comprises:
  determining which new feature set is to be selected for a microcontroller;
  checking for space available in the external memory for a new feature set;
  downloading a new feature set image to the external memory if storage capacity is available in the external memory; and
  determining whether the feature set image is valid and genuine.

14. The method of claim 12, wherein a feature set represents a functionality that is distinct from a functionality of another feature set.

15. The method of claim 14, wherein:
  the microcontroller can contain and use just one feature set; and
  the microcontroller has an internal memory that needs only to hold one feature set to be loaded and booted.

16. The method of claim 13, wherein if the microcontroller needs a different functionality than that of the feature set presently set in it, then the microcontroller can replace the present feature set with another feature set having the different functionality, loaded from the external memory.

17. A controller unit comprising:
  a microcontroller; and
  an on-board external memory communicatively connected to the microcontroller, the on-board external memory storing a plurality of firmwares and each firmware is for a different communication protocol; and
wherein:
  the microcontroller comprises:
    an application;
    a boot loader;
    a configuration storage accessible by the application and the boot loader; and
    an internal memory accessible by the application and the boot loader; and
wherein:
  the external memory comprises more storage capacity than a storage capacity of the internal memory;
  the internal memory is configured to hold at least one feature set;
  the external memory is configured to hold more feature sets than the internal memory; and
  each feature set is a different communication protocol firmware.

18. The unit of claim 17, wherein changing a feature set in the internal memory for a different feature set, comprises:
  scanning an external memory for available feature sets;
  presenting the available feature sets for selection to a user; and
  checking a user selected feature set for validity and genuineness.

19. The unit of claim 18, wherein, if valid and genuine, the selected feature set is downloaded from the external memory to the internal memory.

20. The unit of claim 17, where the different communication protocol firmware comprises two or more of Ethernet/internet protocol (IP) firmware, Profinet firmware and EtherCat firmware.

* * * * *